(12) United States Patent
Wellen

(10) Patent No.: US 7,676,156 B2
(45) Date of Patent: Mar. 9, 2010

(54) METHOD AND SYSTEM FOR MULTIPLEXED OPTICAL INFORMATION TRANSPORT

(75) Inventor: Jeroen Wellen, Leusden (NL)

(73) Assignee: Alcatel-Lucent USA Inc., Murray Hill, NJ (US)

(*) Notice: Subject to any disclaimer, the term of this patent is extended or adjusted under 35 U.S.C. 154(b) by 928 days.

(21) Appl. No.: 10/177,226

(22) Filed: Jun. 21, 2002

(65) Prior Publication Data
US 2002/0196499 A1 Dec. 26, 2002

(30) Foreign Application Priority Data
Jun. 25, 2001 (EP) ................... 01305491

(51) Int. Cl.
*H04J 14/00* (2006.01)
*H04J 14/08* (2006.01)

(52) U.S. Cl. ................. 398/69; 398/70; 398/71; 398/72

(58) Field of Classification Search ............... 398/46, 398/47, 74–75, 45, 173–181, 100, 89
See application file for complete search history.

(56) References Cited

U.S. PATENT DOCUMENTS

| | | | | |
|---|---|---|---|---|
| 4,727,592 A | * | 2/1988 | Okada et al. ............... | 714/55 |
| 4,800,555 A | * | 1/1989 | Foschini ..................... | 398/95 |
| 4,831,616 A | * | 5/1989 | Huber ....................... | 398/100 |
| 5,077,727 A | * | 12/1991 | Suzuki ....................... | 398/75 |
| 5,105,292 A | * | 4/1992 | Le Roy et al. .............. | 398/75 |
| 5,111,323 A | * | 5/1992 | Tanaka et al. .............. | 398/52 |
| 5,119,223 A | * | 6/1992 | Panzer et al. ............... | 398/75 |
| 5,146,514 A | * | 9/1992 | Birk .......................... | 385/24 |
| 5,175,777 A | * | 12/1992 | Bottle ........................ | 385/17 |
| 5,189,414 A | * | 2/1993 | Tawara ...................... | 370/502 |
| 5,194,977 A | * | 3/1993 | Nishio ....................... | 398/48 |
| 5,202,782 A | * | 4/1993 | Nakamura et al. .......... | 398/91 |
| 5,343,314 A | * | 8/1994 | Nakamura et al. .......... | 398/51 |
| 5,349,457 A | * | 9/1994 | Bears ........................ | 398/58 |
| 5,351,146 A | * | 9/1994 | Chan et al. ................. | 398/58 |
| 5,369,516 A | * | 11/1994 | Uchida ...................... | 398/60 |

(Continued)

FOREIGN PATENT DOCUMENTS

JP  H02-223937  9/1990

(Continued)

OTHER PUBLICATIONS

Presentation slides "Wavelength conversion makes the all-optical cross connect much more flexible" in "Understanding Optical Networking", p. 3-28 and 3-29 by Telecommunications Research Associates, copyrighted 2001.*

(Continued)

*Primary Examiner*—Ken N Vanderpuye
*Assistant Examiner*—Danny W Leung
(74) *Attorney, Agent, or Firm*—Wall & Tong, LLP

(57) ABSTRACT

Light carrying information for access terminals is carried via optical fibers. Information for terminals from groups is multiplexed over different time-slots and different communication wavelengths of the light in the fiber for a group. The information is passed between the fibers and the transport network via transceivers. The use of the transceivers is multiplexed between the optical fibers. Each transceiver passes information for selectable light guides at selectable communication wavelengths in different timeslots.

8 Claims, 4 Drawing Sheets

U.S. PATENT DOCUMENTS

| | | | | |
|---|---|---|---|---|
| 5,390,178 | A * | 2/1995 | Hunter | 370/370 |
| 5,410,343 | A * | 4/1995 | Coddington et al. | 725/99 |
| 5,438,444 | A * | 8/1995 | Tayonaka et al. | 398/75 |
| 5,450,225 | A * | 9/1995 | Bostica et al. | 398/54 |
| 5,495,356 | A * | 2/1996 | Sharony et al. | 398/46 |
| 5,510,921 | A * | 4/1996 | Takai et al. | 398/79 |
| 5,523,870 | A * | 6/1996 | Suzuki et al. | 398/100 |
| 5,528,579 | A * | 6/1996 | Wadman et al. | 370/249 |
| 5,544,160 | A * | 8/1996 | Cloonan et al. | 370/395.1 |
| 5,572,349 | A * | 11/1996 | Hale et al. | 398/100 |
| 5,576,874 | A * | 11/1996 | Czerwiec et al. | 398/75 |
| 5,606,555 | A * | 2/1997 | Singer | 370/465 |
| 5,615,036 | A * | 3/1997 | Emura | 398/76 |
| 5,623,356 | A * | 4/1997 | Kaminow et al. | 398/46 |
| 5,657,144 | A * | 8/1997 | Tanaka et al. | 398/48 |
| 5,687,014 | A * | 11/1997 | Czerwiec et al. | 398/75 |
| 5,708,753 | A * | 1/1998 | Frigo et al. | 385/147 |
| 5,724,349 | A * | 3/1998 | Cloonan et al. | 370/390 |
| 5,724,352 | A * | 3/1998 | Cloonan et al. | 370/388 |
| 5,754,319 | A * | 5/1998 | Van De Voorde et al. | 359/349 |
| 5,754,320 | A * | 5/1998 | Watanabe et al. | 398/50 |
| 5,757,527 | A * | 5/1998 | Mock | 398/45 |
| 5,781,320 | A * | 7/1998 | Byers | 398/56 |
| 5,790,287 | A * | 8/1998 | Darcie et al. | 398/108 |
| 5,801,864 | A * | 9/1998 | Takai et al. | 398/72 |
| 5,815,295 | A * | 9/1998 | Darcie et al. | 398/72 |
| 5,831,979 | A * | 11/1998 | Byers | 370/360 |
| 5,847,852 | A * | 12/1998 | Domon et al. | 398/74 |
| 5,861,965 | A * | 1/1999 | Koren et al. | 398/75 |
| 5,864,414 | A * | 1/1999 | Barnsley et al. | 398/71 |
| 5,872,644 | A * | 2/1999 | Yamazaki et al. | 398/63 |
| 5,872,645 | A * | 2/1999 | Proctor | 398/99 |
| 5,912,749 | A * | 6/1999 | Harstead et al. | 398/75 |
| 5,926,472 | A * | 7/1999 | Byers | 370/360 |
| 5,938,309 | A * | 8/1999 | Taylor | 398/79 |
| 5,949,562 | A * | 9/1999 | Kubota et al. | 398/79 |
| 5,953,143 | A * | 9/1999 | Sharony et al. | 398/46 |
| 6,008,918 | A * | 12/1999 | Kanterakis et al. | 398/48 |
| 6,038,226 | A * | 3/2000 | Ellersick et al. | 370/352 |
| 6,097,696 | A * | 8/2000 | Doverspike | 370/216 |
| 6,101,183 | A * | 8/2000 | Byers | 370/380 |
| 6,195,186 | B1 * | 2/2001 | Asahi | 398/5 |
| 6,195,367 | B1 * | 2/2001 | Jakobik et al. | 370/535 |
| 6,198,558 | B1 * | 3/2001 | Graves et al. | 398/135 |
| 6,229,788 | B1 * | 5/2001 | Graves et al. | 370/230 |
| 6,373,604 | B1 * | 4/2002 | Xie | 398/79 |
| 6,385,206 | B1 * | 5/2002 | Nakata | 370/407 |
| 6,400,477 | B1 * | 6/2002 | Wellbrook | 398/45 |
| 6,417,945 | B2 * | 7/2002 | Ishikawa et al. | 398/79 |
| 6,421,150 | B2 * | 7/2002 | Graves et al. | 398/58 |
| 6,424,445 | B1 * | 7/2002 | Tsushima et al. | 398/177 |
| 6,449,069 | B1 * | 9/2002 | Fujita | 398/43 |
| 6,456,406 | B1 * | 9/2002 | Arecco et al. | 398/59 |
| 6,456,407 | B1 * | 9/2002 | Tammela et al. | 398/59 |
| 6,470,032 | B2 * | 10/2002 | Dudziak et al. | 370/503 |
| 6,470,112 | B2 * | 10/2002 | Okayama | 385/24 |
| 6,519,255 | B1 * | 2/2003 | Graves | 370/392 |
| 6,552,832 | B1 * | 4/2003 | Beierle et al. | 398/74 |
| 6,574,018 | B1 * | 6/2003 | Handelman | 398/49 |
| 6,577,422 | B1 * | 6/2003 | Frigo et al. | 398/49 |
| 6,580,549 | B1 * | 6/2003 | Kinoshita | 359/337 |
| 6,583,901 | B1 * | 6/2003 | Hung | 398/79 |
| 6,606,427 | B1 * | 8/2003 | Graves et al. | 385/17 |
| 6,619,865 | B1 * | 9/2003 | Takai et al. | 398/68 |
| 6,632,032 | B1 * | 10/2003 | Dombrowski et al. | 398/16 |
| 6,674,966 | B1 * | 1/2004 | Koonen | 398/70 |
| 6,674,968 | B1 * | 1/2004 | Xie | 398/79 |
| 6,678,473 | B1 * | 1/2004 | Morthier | 398/56 |
| 6,714,740 | B2 * | 3/2004 | Tajima | 398/31 |
| 6,718,140 | B1 * | 4/2004 | Kamei et al. | 398/68 |
| 6,751,417 | B1 * | 6/2004 | Combs et al. | 398/71 |
| 6,763,191 | B1 * | 7/2004 | Handelman | 398/45 |
| 6,785,438 | B2 * | 8/2004 | Lin et al. | 385/16 |
| 6,807,188 | B1 * | 10/2004 | Blahut et al. | 370/442 |
| 6,810,215 | B1 * | 10/2004 | Oikawa | 398/175 |
| 6,868,232 | B2 * | 3/2005 | Eijk et al. | 398/5 |
| 6,868,233 | B2 * | 3/2005 | Foltzer | 398/16 |
| 6,868,234 | B1 * | 3/2005 | Tammela et al. | 398/59 |
| 6,870,836 | B1 * | 3/2005 | Dyke et al. | 370/355 |
| 6,882,765 | B1 * | 4/2005 | Erickson et al. | 385/16 |
| 6,889,007 | B1 * | 5/2005 | Wang et al. | 398/79 |
| 6,915,075 | B1 * | 7/2005 | Oberg et al. | 398/9 |
| 6,970,461 | B2 * | 11/2005 | Unitt et al. | 370/390 |
| 6,975,586 | B1 * | 12/2005 | Yoshimura | 370/217 |
| 7,035,540 | B2 * | 4/2006 | Finan et al. | 398/59 |
| 7,106,967 | B2 * | 9/2006 | Handelman | 398/47 |
| 7,130,539 | B2 * | 10/2006 | Shahar et al. | 398/46 |
| 7,149,432 | B1 * | 12/2006 | Smith et al. | 398/158 |
| 7,167,650 | B2 * | 1/2007 | Farries | 398/75 |
| 7,254,330 | B2 * | 8/2007 | Pratt et al. | 398/67 |
| 7,340,175 | B2 * | 3/2008 | Wang et al. | 398/82 |
| 7,382,982 | B2 * | 6/2008 | Lee et al. | 398/100 |
| 7,386,235 | B2 * | 6/2008 | Jennen et al. | 398/72 |
| 2001/0005439 | A1 * | 6/2001 | Kim et al. | 385/28 |
| 2001/0022875 | A1 * | 9/2001 | Asahi | 385/17 |
| 2001/0030785 | A1 * | 10/2001 | Pangrac et al. | 359/125 |
| 2001/0030787 | A1 * | 10/2001 | Tajima | 359/128 |
| 2002/0012138 | A1 * | 1/2002 | Graves et al. | 359/118 |
| 2002/0048067 | A1 * | 4/2002 | Handelman et al. | 359/139 |
| 2002/0071149 | A1 * | 6/2002 | Xu et al. | 359/110 |
| 2002/0135843 | A1 * | 9/2002 | Gruia | 359/167 |
| 2002/0184644 | A1 * | 12/2002 | Lund et al. | 725/107 |
| 2002/0196499 | A1 * | 12/2002 | Wellen | 359/135 |
| 2003/0016770 | A1 * | 1/2003 | Trans et al. | 375/346 |
| 2007/0025735 | A1 * | 2/2007 | Sakamoto et al. | 398/75 |

FOREIGN PATENT DOCUMENTS

JP 2000-004461 1/2000

OTHER PUBLICATIONS

Shao, Shou; Wu, Jingshown, "An IP over WDM protocol with routing and transport capabilities", High Performance Switching and Routing, 2000. ATM 2000. Proceedings of the IEEE Conference on; Jun. 26, 2000.*

Wei, J.Y. Changdong Liu Liu, K.H., "IP over WDM traffic engineering", Electronic-Enhanced Optics, Optical Sensing in Semiconductor Manufacturing, Electro-Optics in Space, Broadband Optical Networks, 2000.*

XP 000559169 "Passive Optical Networks" by D.B. Payne, Sep. 27, 1992.

XP 000631516 "Optical Path Technologies: A Comparison Amoung Different Cross-Connect Architectures" by E. Iannone, IEEE vol. 14, Oct. 1996.

"An All-Optical Multifiber Tree Network" by J. Bannister, IEEE, vol. 11, May 1, 1993.

* cited by examiner

METHOD AND SYSTEM FOR MULTIPLEXED OPTICAL INFORMATION TRANSPORT

CROSS-RELATED TO RELATED APPLICATION

This application claims the benefit of priority from corresponding European Application Serial No. 01305491.1, filed Jun. 25, 2001.

TECHNICAL FIELD

The invention relates to a communications network and, in particular, to connections between a transport network and access terminals.

BACKGROUND OF THE INVENTION

Communications networks are known that use a passive optical network to connect a transport network, such as the telephone transport network, to access terminals, such as end user terminals (e.g., see European Patent Application No. 1061764). As described in this reference, the passive optical network contains a bundle of N optical fibers and each of the fibers connects to a plurality of access terminals. Each single optical fiber is able to carry light of a number of M different communication wavelengths, so the network is capable of transmitting information at a number M of wavelengths in each fiber. Since a passive optical network is used, information may be transported to or from a terminal through the N optical fibers.

This type of network may employ statistical multiplexing of the use of the optical fibers and wavelengths to provide a large information transport capacity at relatively low cost. Statistical multiplexing is based on the activity pattern that is characteristic of access terminals. These terminals are only active intermittently and, as a result, only need a low transport capacity on average. However, when active, an access terminal may need a maximum transport capacity that is much larger than the average capacity. This allows multiplexing of the use of fibers and wavelengths between terminals, fibers and wavelengths being allocated to specific access terminals only when needed. Thus, much less capacity is needed than the product of the maximum capacity per access terminal and the number of access terminals, although each individual terminal may use the maximum capacity from time to time.

Although the assignment of terminals to times of transport and wavelengths is addressed in the aforementioned patent application, prior art arrangements do not address the way that light of different wavelengths is optically provided in the different fibers in such a network. One possible way to do this would be to provide a set of M light sources, light modulators and light demodulators for M different wavelengths for each of the N optical fibers. However, such a solution is expensive because it would require a large number (N×M) of light sources, light modulators and light demodulators.

SUMMARY OF THE INVENTION

The number of components needed for multiplexing transport of optically modulated information to and from access terminals is substantially reduced according to the principles of the invention. More specifically, a method is provided for multiplexing information transport between a plurality of access terminals and a transport network. Light carrying information for (i.e. to or from) different access terminals is transported via N light guides (e.g. optical fibers) and passed to and/or from a transport network by L transceivers. Information for a group of different access terminals is multiplexed over the same fiber by time slot multiplexing and wavelength multiplexing. Each transceiver passes information from a selectable communications wavelength.

According to the principles of the invention, the use of transceivers is multiplexed between the different light guides. Depending on the demand for information transport, different transceivers may at one time pass information with different communications wavelengths for the same fiber and, at another time, they may pass information with the same wavelength (or different wavelengths) for different fibers. At other times, mixtures of these extremes may occur. Thus, the number of transceivers that is needed to pass information from the access terminals to the transport network can be reduced. Preferably, the number of transceivers (L) is smaller than the number of light guides (N). In any case, the number L of transceivers can be considerably smaller than the number M of communications wavelengths used times the number of light guides N.

In an illustrative embodiment, a connection between the light guides and the transceivers is realized by means of a wavelength independent cross-connect unit and filters which pass a selectable wavelength between the cross-connect unit and the transceivers. Thus, multiplexing can be realized with a relatively small number of components.

In another embodiment, the connection between the light guides and the transceivers is realized by means of a set of cross-connect units, each performing the cross-connection for one of the communications wavelengths, and wavelength splitters and combiners to split the light from the light guides for use by the different cross-connect units and to merge the light from the different cross-connect units respectively.

Preferably both the use of the receivers that pass information "upstream", from the access terminals to the network, and of transmitters that pass information "downstream", from the transport network to the access terminals, is multiplexed over the N different light guides and M different wavelengths. For this purpose, a further cross-connect unit may be provided, so that there are different cross-connects for upstream and downstream information transport.

As an alternative, the cross-connect unit that is used for upstream information might also be used for "downstream" communication. However, this may reduce the transport capacity to half-duplex, compared to full-duplex with the use of two cross-connect units, one for upstream traffic and one for downstream traffic.

BRIEF DESCRIPTION OF THE DRAWING

A more complete understanding of the invention may be obtained from consideration of the following detailed description of the invention in conjunction with the drawing, with like elements referenced with like reference numerals, in which.

DETAILED DESCRIPTION

Figure 1:
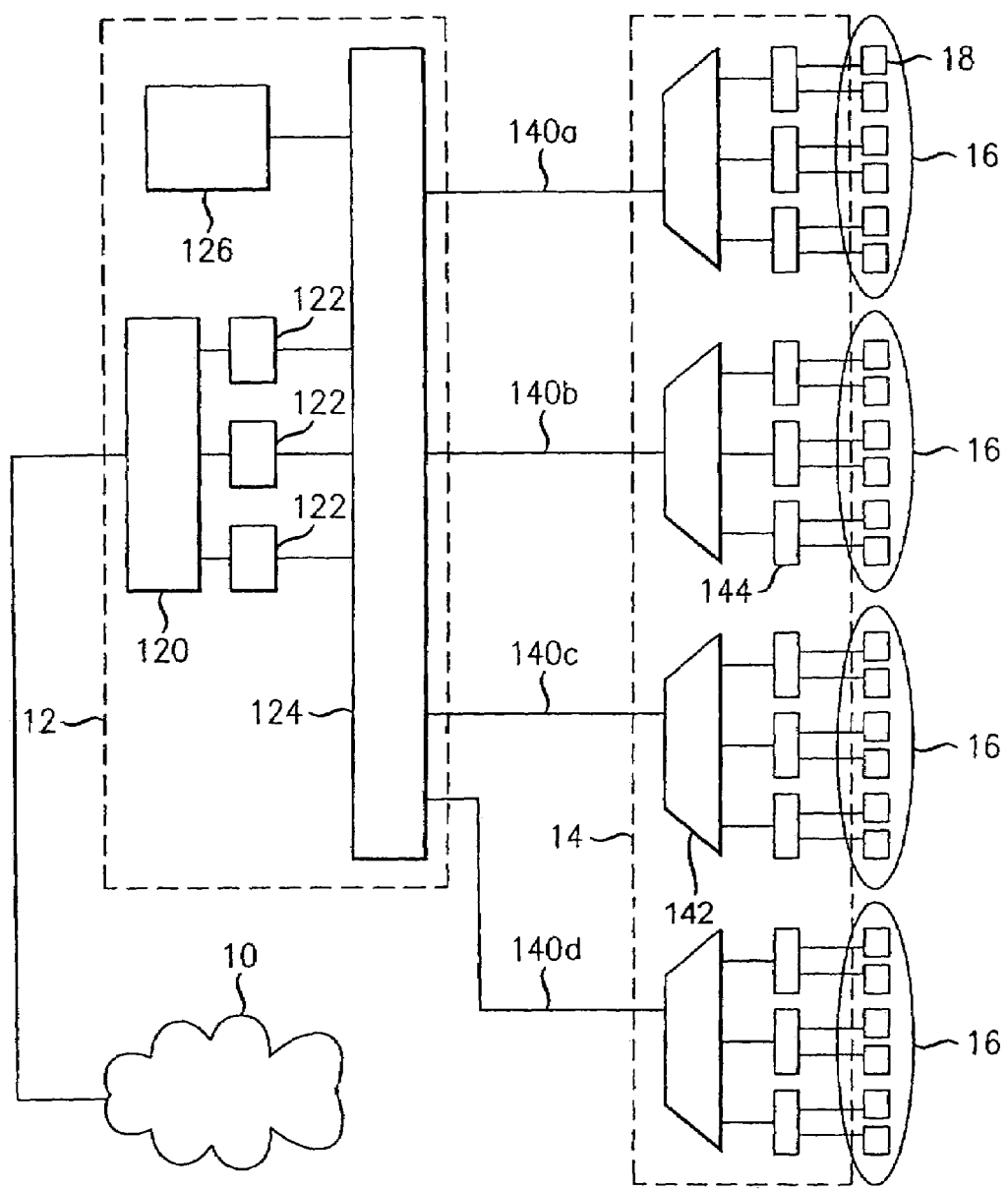
FIG. 1 is an exemplary communication network according to an illustrative embodiment of the invention.

FIG. 1 shows an exemplary communication network. The network contains a transport network 10, a local exchange 12, a passive optical network 14 and a number of groups 16 of optical network units 18. For sake of clarity, only one optical network unit 18 is numbered explicitly, while the other optical network units are shown below and above it. A similar convention, for sake of clarity and brevity, will also be used for numbering other types of similar elements. The local exchange 12 contains an optical line termination 120, a plurality of transceivers (transmitters and/or receivers) 122, an optical cross-connect 124 and a control unit 126. The passive optical network 14 contains optical fibers 140a-d, wavelength multiplexer/demultiplexers 142a-c and splitters/combiners 144. Although three transceivers 122 are shown by way of example, two transceivers or a larger number of transceivers may of course be used. The same holds, mutatis mutandis, for the number of fibers 140a-d, the number of multiplexers/demultiplexers 142a-c, the number of splitter/combiners 144, the number of groups 16, the number of optical network units 18, and so on. The transceivers 122 may be transmitters for passing information "downstream" from the transport network 10 to the optical network units 18, or receivers for passing information "upstream" from the optical network units 18 the transport network 10.

Within the context of the present invention, the optical network units 18 function as access terminals.

In operation in the "downstream" direction, information from transport network 10 is received by optical line termination 120 and passed to transmitters 122. The transmitters 122 generate light onto which the information has been modulated. Optical cross-connect 124 passes this light to selected ones of the fibers 140a-d. Control unit 126 controls the optical cross-connect 124, so as to determine from which transceiver 122 light is passed to which fiber 140a-d. Each fiber 140a-d corresponds to a multiplexer/demultiplexer 140a-d and a group of splitter/combiners 144, through which it serves a group 16a-c of optical network units 18. The respective fibers 140a-d pass light to the respective, corresponding multiplexer/demultiplexers 142a-c. The multiplexer/demultiplexers 142a-c split the light into different wavelength components, each in a different wavelength range. Although outputs for two wavelength components are shown by way of example, a larger or different number may be preferably used. Multiplexers/demultiplexers 142a-c pass each wavelength component to a respective one of the splitter/combiners 144, which distributes the light of the component to the optical network units 18 of the relevant group 16a-c.

Conversely, in the "upstream" direction each splitter/combiners 144 combines light that carries information from different optical network units 18 and passes the combined light to a multiplexer/demultiplexer 142a-c. The multiplexer/demultiplexers 142a-c multiplex the light from a group of different splitter/combiners 144, each splitter/combiner in the group contributing a different wavelength in the combined signal. The fibers 120a-c pass the multiplexed light to the optical cross-connect unit 124. The optical cross connect units pass the light to the receivers 122, which read the information and pass it to the transport network 10 via optical lint termination 120. The control unit 126 controls the optical cross connect, so as to determine from which fiber 140a-d light is passed to which transceiver 122.

The optical cross-connect 124 serves to multiplex the use of the transceivers 122 for reception of light of different wavelengths from different fibers 140a-d and/or transmission of light of different wavelengths to fibers 140a-d. This is controlled by control unit 126. The control unit bases the selection of the wavelength and fiber 140a-d for which the transceivers 122 are used on the need for communication of the optical network units 18.

If many optical network units 18 in a same group 16a-c need communication capacity at the same time, control unit 126 switches optical cross connection 124 so that transceivers 122 connect to the same fiber 140a-d, but at different wavelengths, so as to serve multiple optical network units 18 from the same group 16a-c simultaneously. When the communication capacity demanded for the optical network units 18 is distributed more evenly over the groups 16a-c, the transceivers are connected to different fibers 140a-d, operating for selected wavelengths, which may be the same or different, as required by the optical network units 18 that need service. Thus, communication to and/or from the optical network units 18 is multiplexed over time-slots and wavelengths. Any known allocation scheme for statistical multiplexing may be used to allocate the transceivers to fibers 140a-d and wavelengths. The multiplexing scheme can be applied either to downstream communication or to upstream communication or to a combination of both.

Figure 2:
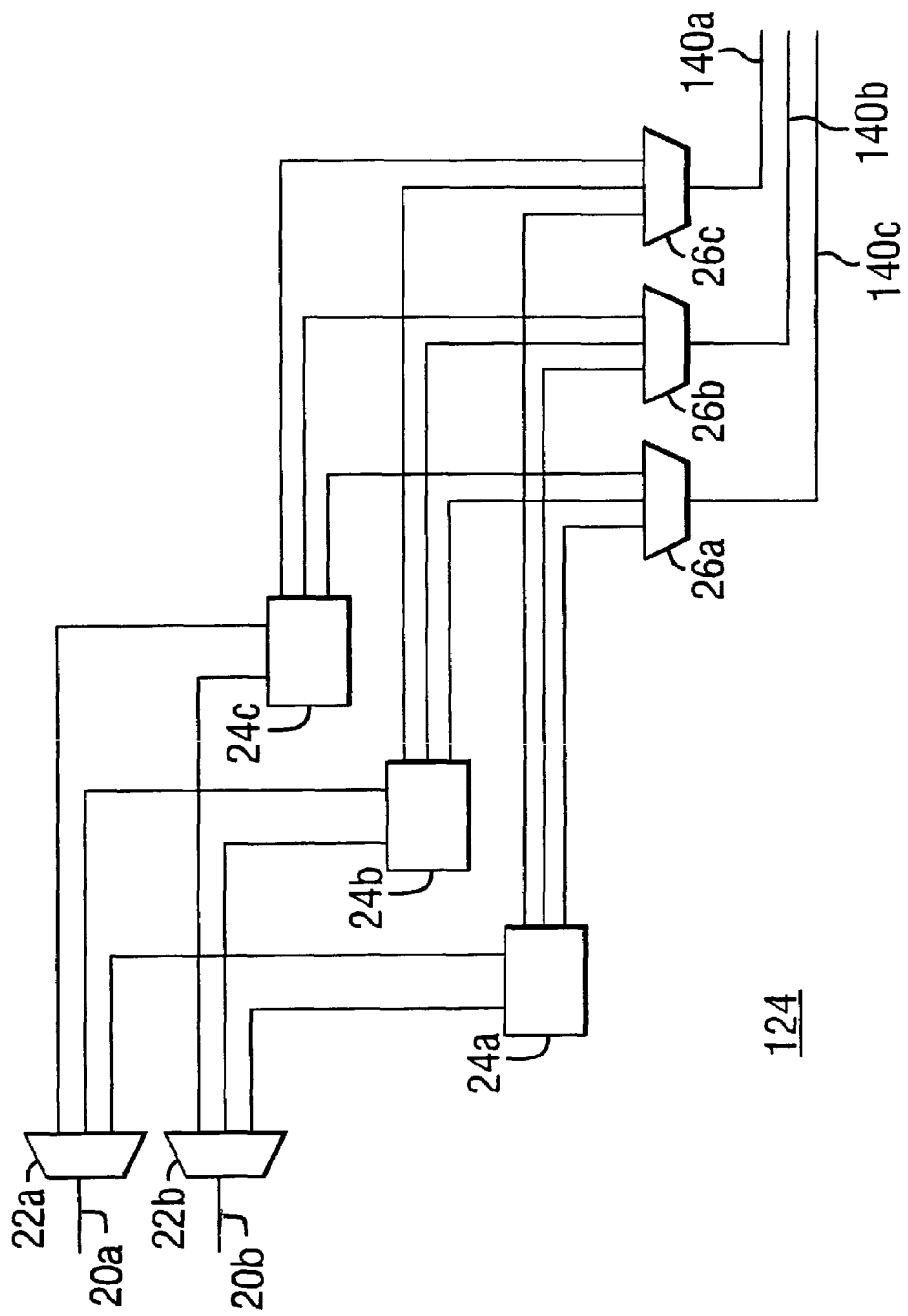
FIG. 2 shows an optical cross connect according to an illustrative embodiment of the invention.

FIG. 2 shows an optical cross-connect 124 for use in a network according to FIG. 1, in either the "upstream" or the "downstream" direction. Cross-connect 124 contains inputs/outputs 20a,b for transceivers (only two outputs are shown by way of example), first and second multiplexers/demultiplexers 22a-b, 26a-c and sub cross-connect units 24a-c. The input/outputs 20a,b form the multiplexed input/output of respective ones of the first multiplexers/ demultiplexers 22a-b. Each first multiplexers/demultiplexers 22a-b has a number of demultiplexed input/outputs, each for a different range of wavelengths (this range corresponds to a communication wavelength). Similarly, the multiplexed input/outputs of each of the second multiplexers/demultiplexers 26a-c is coupled to a respective one of the fibers 140a-d and the second multiplexers/demultiplexers 26a-c have a number of demultiplexed input/outputs, each for a different range of wavelengths. Each sub cross-connect unit 24a-c cross connects demultiplexed input/outputs from the first and second multiplexers/demultiplexers 22a-b, 26a-c for a respective one of the ranges of wavelengths. It will be understood that any number of outputs 20a,b, multiplexers/demultiplexers 22a-b, 26a-c, cross-connect units 24a-c may used.

Figure 2A:
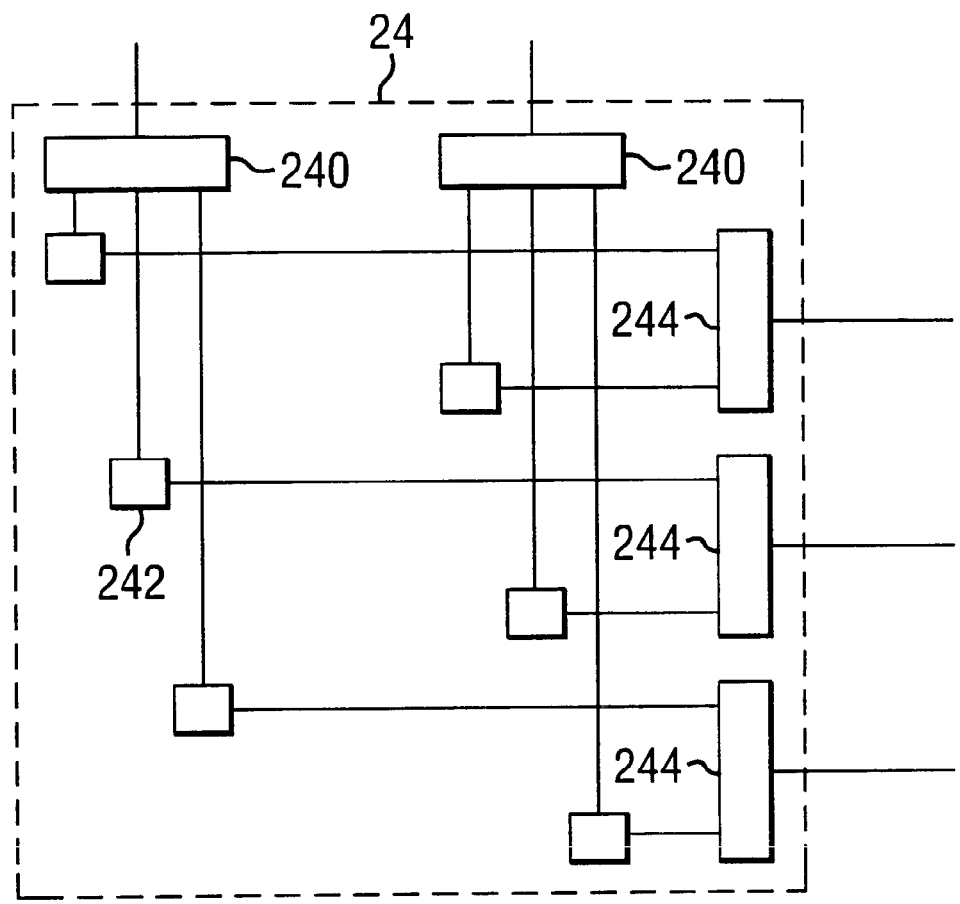
FIG. 2A shows a cross-connect unit according to an illustrative embodiment of the invention.

FIG. 2A shows an embodiment of a sub cross-connect unit 24. The sub cross-connect units 24 contains first and second splitter/combiners 240, 244 and optical switches 242 (only one numbered explicitly). The first splitter/combiner 240 has combination inputs/outputs to demultiplexed input/outputs from respective ones of the first multiplexer/demultiplexers 22a-b. The second splitter/combiner 240 has combination inputs/outputs to demultiplexed input/outputs from respective ones of the second multiplexer/demultiplexers 26a-c. The optical switches 242 each interconnect a split input/output of the first splitter/combiner 240 with a split input/output of the second splitter combiner. The optical switches 242 operate under control of control unit 126 (not shown). It will be clear that cross-connect units with different numbers of connections can be realized by using a different number of splitter/combiners, with different numbers of input outputs and more switches.

In operation, each optical switch 242 receives light from one wavelength range from one transceiver 122 and one optical fiber 140a-d. The optical switch 242 selectively passes or blocks this light under control of control unit 126.

Figure 3:
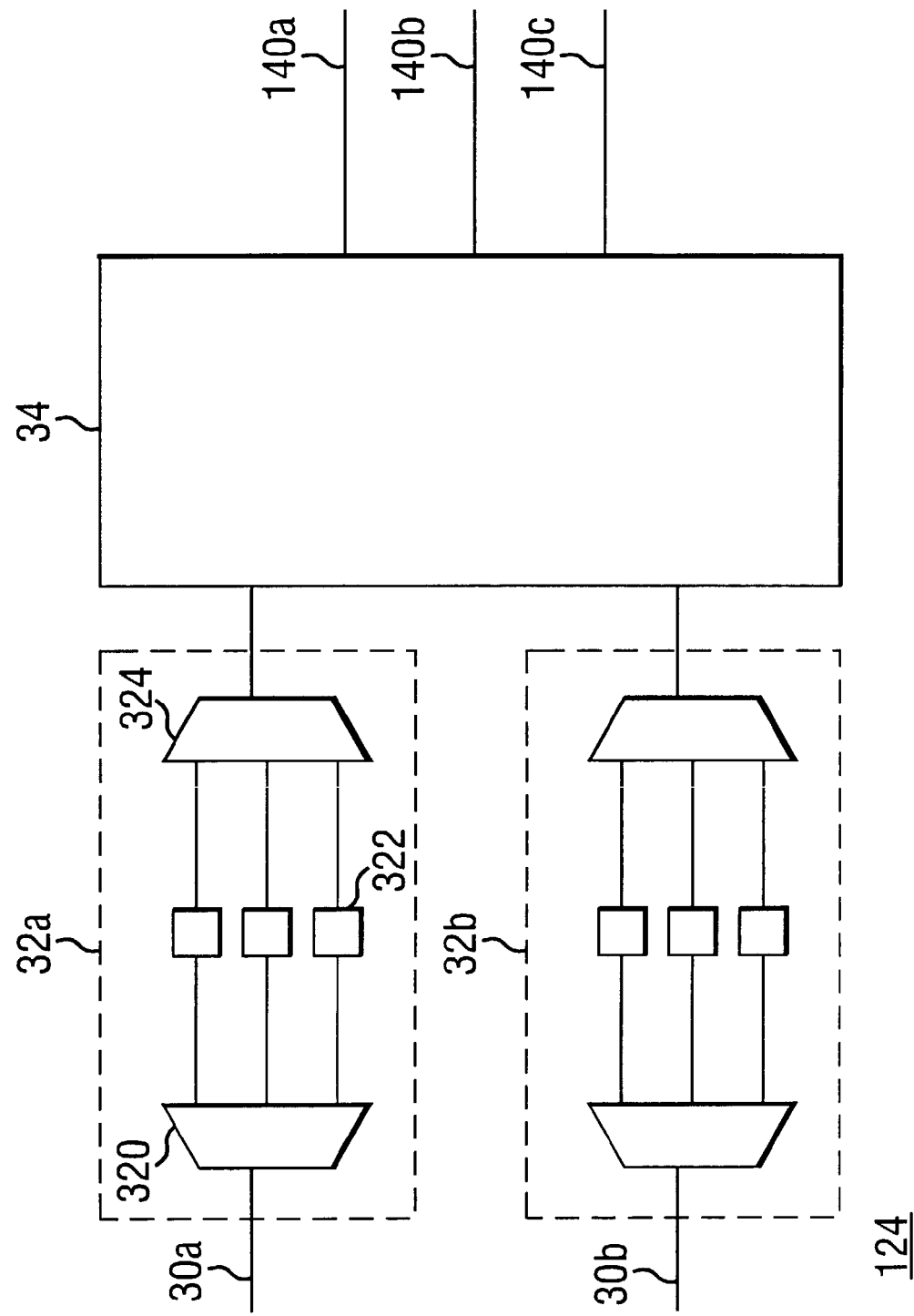
FIG. 3 shows an optical cross connect according to another illustrative embodiment of the invention.

FIG. 3 shows a further optical cross-connect 124 for use in a network according to FIG. 1. Cross-connect 124 includes transceiver inputs/outputs 30a-b for different ones of the transceivers 122, filters 32a-b and a sub-cross connect unit 34. The sub cross-connect unit 34 is of a similar structure as the sub cross-connect units 24 of figure 2A. The sub cross-connect unit 34 has first input/outputs coupled to the fibers 140a-d and second input/outputs coupled to respective ones of the transceiver inputs/outputs 30a-b via respective ones of the filters 32a-b. Each filter contains a first and second multiplexer/demultiplexer 320, 324 and optical switches 322. The input/outputs 30a-b for transceivers 122 form the multiplexed input/output of the first multiplexer/demultiplexer 320. The first multiplexer/demultiplexer 320 has a number of demultiplexed input/outputs, each for a different range of wavelengths (this range corresponds to a communication wavelength). The second multiplexer/demultiplexer 320 has a number of demultiplexed input/outputs, each for a different range of wavelengths, coupled each coupled to a corresponding demultiplexed input/output of the first multiplexer/demultiplexer 320 via a respective one of the optical switches 322. A multiplexed input/output of the second multiplexers/demultiplexers 324 is coupled to a respective one of the input/outputs of the sub cross-connect unit 34. The optical switches 322 operate under control of the control unit 126 (not shown).

In operation, sub-cross connect unit 34 passes light from a selected one of the fibers to a selected one of the transceivers 122 under selection by control unit 126. The filters 32 ensure that only a selected one of the wavelengths is passed to or from the transceivers 122. Compared with the optical cross connect of FIG. 2, considerably fewer optical switches are needed.

In case statistical multiplexing is applied to upstream communication, the sub cross-connect unit 34 passes light of all wavelengths from a fiber 140a-d to selected ones of the filters 32. The light of a single fiber 140a-d may contain multiple wavelengths carrying information from different optical network units 18 in the same group 16a-c. In this case, the control unit 126 will control the optical switches in the sub cross-connect unit 34 so that the light from this fiber 140a-d is passed to more than one of the filters 32. The control unit 126 controls each filter so that light components with different wavelengths are passed to different receivers 122. The receivers 122 are not wavelength-specific, i.e., they can decode information from light of any wavelength. Thus, control unit 126 controls which wavelength from which fiber 140a-d is decoded in each receiver 122.

Similarly, in case of downstream communication, if the cross connect of FIG. 2 is used, the control unit 126 controls optical switches in the sub-cross connect units 240a-c to determine which wavelength from transmitter 122 is passed to fiber 140a-d and, again, transmitters 122 may be wavelength unspecific.

In case statistical multiplexing is applied to downstream communication, transmitters 122 may be used that modulate light of all available wavelengths. Only a single modulator is needed for all wavelengths in this case. Modulated light is transmitted to the sub cross-connect unit 34 via filters 32 which select one wavelength and pass light of this wavelength to a selected fiber 140a-d via sub-cross connect unit. A similar effect is achieved with the cross connect 124 of FIG. 2.

Figure 4:
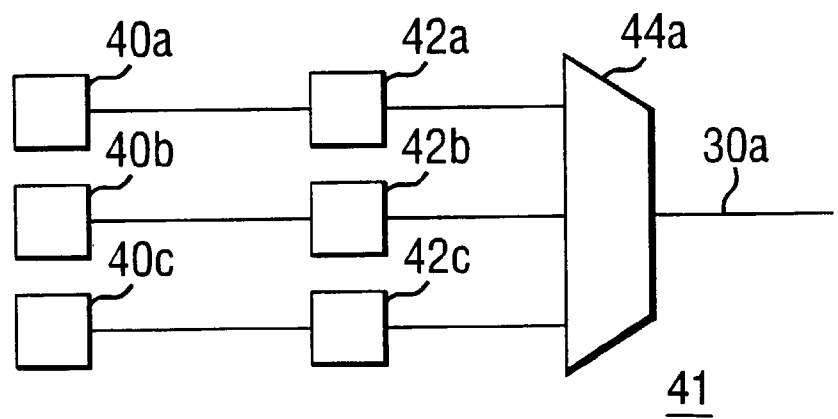
FIG. 4 shows a modulator filter according to an illustrative embodiment of the invention.

FIG. 4 shows a combined modulator/filter 41 in which, as an alternative, the function of the filter 32 and the modulator of the transceiver 122 may be combined in the downstream case. The modulator/filter contains a plurality of single wavelength light sources 40a-c for different wavelengths, a plurality of optical modulators 42a-c and a multiplexer 44. Each source 40a-c is connected to a respective demultiplexed input of the multiplexer 44 via a respective one of the optical modulators 42a-c. The multiplexed output of the multiplexer 44 may be connected to fibers 140a-d via a sub cross connect unit 46, which is implemented, for example, as one of the sub cross connect units of FIG. 2A. In operation, a selected one of the modulators 42a-c is enabled under control of control unit 126 and information from the transport network 10 is used to control modulation by the enabled modulator 42a-c. Thus, the modulator/filter produces modulated light of a single wavelength. The sources 40a-c may be shared by different transceivers. Thus a minimum cost is required for the sources.

In principle, transceivers 122 may be used that can handle both upstream and downstream traffic; simultaneously if necessary. In this case, the optical cross-connects of FIGS. 2 and 3 will provide selection for upstream and downstream traffic simultaneously. However, this may reduce the transmission capacity from full-duplex to half-duplex. In one embodiment, cross connect 124 contains two arrangements as shown in FIG. 2 or 3 in parallel, one for multiplexing of downstream communication and one for multiplexing upstream communication.

What is claimed is:

1. A method of communication between a plurality of passive optical network access terminals and a transport network, the method comprising:
    modulating and demodulating optical signals in a local exchange between the passive optical network and the transport network;
    transporting light carrying information for respective groups of access terminals via a respective light guide for each group, the information for different access terminals in each group being optically multiplexed in the light guide for that group over different time slots and different communication wavelengths of the light;
    passing the information between the light guides and the transport network via a plurality of transceivers, wherein each transceiver includes an optical transmitter for passing information from the transport network to the light guides and an optical receiver for passing information from the light guides to the transport network; and
    multiplexing use of the transceivers, wherein each transceiver passes and receives optical information both to and from selectable light guides at selectable communication wavelengths in different time slots through a cross-connection unit;
    wherein selection of the light guides, wavelengths and time slots to be used is performed by a control unit; and
    wherein the number of transceivers used is less than the number of light guides used.

2. A method according to claim 1, further comprising:
    dynamically cross-connecting the light guides to respective cross-connect input/outputs each corresponding to a respective one of the transceivers; and
    dynamically selecting a respective communications wavelength for each transceiver and filtering out light components at other wavelengths than the selected wavelength from light passed between transceiver input and output ports.

3. A communications network comprising:
    a transport network; and
    a passive optical network comprising;
        a plurality of access terminals;

a plurality of light guides, each coupling a respective group of the access terminals to the transport network, and configured to carry optical information between the transport network and different access terminals in each group as time and wavelength multiplexed optical signals;

a plurality of local exchanges between the light guides and the transport network comprising;

a plurality of transceivers, each transceiver comprising a transmitter for passing optical information from the transport network to the light guides and a receiver for passing information from the light guides to the transport network;

a cross-connection unit between the light guides and the transceivers, arranged to make selectable active couplings for bi-directional light transport between each light guide and a respective selectable combination of the transceivers, simultaneous active couplings between any one of the light guides and any one of the different transceivers being allowed, the coupling between that one of the light guides to each actively coupled transceiver being at a respective selectable communication wavelength; and a control unit for dynamically activating the couplings selectively on the basis of transport capacity requirements of the access terminals;

wherein the number of transceivers in the passive optical network is less than the number of light guides.

4. A communications network according to claim 3, wherein the cross-connection unit comprises:

a sub-unit arranged to make selectable active couplings for light transport between each light guide and a respective selectable combination of connections, each coupling passing all communication wavelengths, each connection being provided for a corresponding one of the transceivers; and a respective filter between each connection and the corresponding one of the transceivers respectively, the respective filter passing a communications wavelength selectable by the control unit.

5. A communications network according to claim 3, wherein at least one of the local exchanges includes a cross-connection unit comprising:

a sub-unit arranged to make selectable active couplings for light transport between each light guide and a respective selectable combination of connections, each coupling passing all communication wavelengths, each connection being provided for a corresponding one of the transceivers;

a wavelength multiplexing unit, with a multiplexed connection coupled to one of the connections of the sub-unit and demultiplexed connections for individual ones of the communications wavelengths; light sources for respective ones of the wavelengths; all-optical switches controlled each between a respective one of the light sources and a respective one of the demultiplexed connections by the selection of the wavelength for the at least one of the transceivers and the optical information that is passed to the access terminals by the transceiver.

6. communications network according to claim 3, wherein the cross-connection unit comprises:

respective first wavelength multiplexing units, each with a multiplexed connection coupled to a respective one of the light guides and demultiplexed connections for individual ones of the communications wavelengths;

respective second wavelength multiplexing units, each with a multiplexed connection coupled to a respective one of the transceivers and demultiplexed connections for individual ones of the communications wavelengths;

a plurality of sub-cross-connection units, each coupling the demultiplexed connections of the first and second multiplexing units for a respective one of the communications wavelengths.

7. communications network according to claim 3, wherein the transceivers are arranged for transporting information received from the access terminals to the transport network only, the communications network comprising:

further transceivers connected to the transport network, for passing information from the transport network to the access terminals only;

a further cross-connection unit between the light guides and further transceivers, arranged to make selectable active couplings for light transport from each transceiver to a respective selectable one of the light guides.

8. A communications network according to claim 7, the active couplings from the further transceiver to the combination of light guides being at respective selectable communication wavelengths.

* * * * *